(12) United States Patent
Lee et al.

(10) Patent No.: US 9,830,512 B2
(45) Date of Patent: Nov. 28, 2017

(54) METHOD AND APPARATUS FOR TRACKING GAZE

(71) Applicant: HYUNDAI MOTOR COMPANY, Seoul (KR)

(72) Inventors: Jae Ho Lee, Uiwang-si (KR); Seon A Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 74 days.

(21) Appl. No.: 14/567,477

(22) Filed: Dec. 11, 2014

(65) Prior Publication Data

US 2016/0063319 A1    Mar. 3, 2016

(30) Foreign Application Priority Data

Aug. 26, 2014 (KR) .................. 10-2014-0111779

(51) Int. Cl.
| | |
|---|---|
| *G06K 9/00* | (2006.01) |
| *G06T 7/73* | (2017.01) |
| *G06T 7/246* | (2017.01) |

(52) U.S. Cl.
CPC .......... *G06K 9/00597* (2013.01); *G06T 7/246* (2017.01); *G06T 7/73* (2017.01);
(Continued)

(58) Field of Classification Search
CPC ............ G06K 9/00035; G06K 9/00597; G06T 7/0042; G06T 2207/30041; G06T 2207/30241
See application file for complete search history.

(56) References Cited

U.S. PATENT DOCUMENTS

| | | | |
|---|---|---|---|
| 9,268,024 B1* | 2/2016 | Starner | .................. G01S 17/08 |
| 2006/0110008 A1* | 5/2006 | Vertegaal | .......... G06K 9/00604 |
| | | | 382/103 |

(Continued)

FOREIGN PATENT DOCUMENTS

| | | | |
|---|---|---|---|
| JP | 2005-013752 A | 1/2005 |
| JP | 2005-185431 A | 7/2005 |

(Continued)

OTHER PUBLICATIONS

Villanueva, Arantxa, Cabeza, Rafael. "Models for Gaze Tracking Systems". EURASIP Journal on Image Video Processing. 2007.*

(Continued)

*Primary Examiner* — Kim Vu
*Assistant Examiner* — Molly Delaney
(74) *Attorney, Agent, or Firm* — McDermott Will & Emery LLP

(57) ABSTRACT

A method for tracking a gaze includes determining a position of a first center point of a cornea by using at least two lighting reflection points detected from an eyeball area of a first face image of a user and calculating a first vector connecting at least two first image feature points detected from the first face image to the position of the first center point of the cornea. A position of a second center point of the cornea is determined using the first vector and a position of the feature point detected from the second face image. A second vector is determined using the position of the second center point of the cornea and a position of a center point of a pupil. The gaze of the user is tracked by using the second vector. An apparatus for tracking a gaze is also disclosed.

18 Claims, 7 Drawing Sheets

(52) U.S. Cl.
CPC .............. *G06T 2207/30041* (2013.01); *G06T 2207/30241* (2013.01)

(56) References Cited

U.S. PATENT DOCUMENTS

| | | | | |
|---|---|---|---|---|
| 2011/0228975 A1* | 9/2011 | Hennessey | ............. | A61B 3/113 382/103 |
| 2011/0249868 A1* | 10/2011 | Tsukizawa | ............. | A61B 3/113 382/103 |
| 2013/0329957 A1* | 12/2013 | Ebisawa | ................ | A61B 3/113 382/103 |

FOREIGN PATENT DOCUMENTS

| | | |
|---|---|---|
| JP | 2007-136000 A | 6/2007 |
| JP | 2010-259605 A | 11/2010 |
| KR | 10-2014-0045873 A | 4/2014 |

OTHER PUBLICATIONS

Zhu, Zhiwei, JI, Qiang."Novel Gaze Tracking Techniques Under Natural Head Movement" IEEE Transactions on Biomedical Engineering vol. 54 No. 12 Dec. 2007.*

* cited by examiner

US 9,830,512 B2

METHOD AND APPARATUS FOR TRACKING GAZE

CROSS-REFERENCE TO RELATED APPLICATION

This application claims the benefit of priority to Korean Patent Application No. 10-2014-0111779, filed on Aug. 26, 2014 in the Korean Intellectual Property Office, the disclosure of which is incorporated herein in its entirety by reference.

TECHNICAL FIELD

The present inventive concept relates to a method and an apparatus for tracking a gaze, and more particularly to a technology for tracking a gaze of a user.

BACKGROUND

In general, when a gaze is tracked by using a face image of a user, a gaze vector is detected by using a lighting reflection point and a center of pupil. If the lighting reflection point and the center of pupil are calculated exactly, an exact gaze vector may be detected theoretically.

In a case of a method of detecting a gaze vector by using the lighting reflection point, a center point of cornea is obtained by using a crossing point of lines connecting lighting reflection points generated in a pupil by two infrared light emitting diodes (LEDs) to respective lightings. After a center of pupil is obtained by applying an image processing scheme to an image of an eyeball appearing at a camera, a gaze is calculated by using a vector connecting the center of pupil to a center point of cornea.

As mentioned above, in order to detect a gaze vector by using the lighting reflection point and the center of pupil, if the lighting reflection point and the center of the pupil are exactly detected, the gaze vector may be exactly calculated theoretically. However, in a case of the lighting reflection point, the lighting reflection point is spread in a direction of the eye. Alternatively, when a user wears spectacles, the lighting reflection point may be shielded due to light in the spectacles. In this case, the gaze vector cannot be calculated.

SUMMARY

The present inventive concept has been made in view of the above problems, and provides a method of tracking a gaze by determining a position of a center point of cornea from an image not having a detected lighting reflection point by using a vector calculated based on a position of a center of a cornea determined from an image having the detected lighting reflection point and at least one feature point in a face image, and an apparatus thereof.

In accordance with an aspect of the present inventive concept, a method for tracking a gaze includes: determining a position of a first center point of a cornea by using at least two first lighting reflection points detected from an eyeball area of a first face image of a user; determining a first vector connecting at least two first image feature points detected from the first face image to the position of the first center point of the cornea; determining a position of a second center point of the cornea corresponding to a second face image by using the first vector and a position of at least two second image feature points detected from the second face image, when at least two second lighting reflection points are not detected from an eyeball area of the second face image of the user; determining a second vector by using the position of the second center point of the cornea and a position of a center point of a pupil detected from the eyeball area of the second face image; and tracking the gaze of the user by using the second vector.

In certain embodiments, at least one of the second image feature points may be substantially identical to at least one of the first image feature points.

In certain embodiments, determining a second vector may include determining the position of the center point of the pupil from the eyeball area of the second face image and determining a vector connecting the second center point of the cornea to the center point of pupil.

In certain embodiments, determining the position of the first center point of the cornea includes detecting the at least two first lighting reflection points generated due to at least two lightings and determining the first center point of the cornea as a crossing point of at least two extension lines connecting the first lighting reflection points to the at least two lightings.

In certain embodiments, the first image feature points comprise a left end point and a right end point of an eye of the user. In certain embodiments, determining the first vector includes determining a left vector from the left end point of the eye of the user to the first center point of the cornea and determining a right vector from the right end point of the eye of the user to the first center point of the cornea.

In certain embodiments, at least one of the first image feature points includes at least one of a facial feature point of the user and a feature point of an accessory worn by the user.

In accordance with another aspect of the present inventive concept, an apparatus for tracking a gaze includes a feature point detector configured to detect at least two lighting reflection points and a first center point of a pupil from an eyeball area of a first face image of a user, at least two first image feature points from the first face image, and a second center point of the pupil and at least two second image feature points from a second face image of the user. A position determiner may be configured to determine a position of a first center point of a cornea by using the at least two lighting reflection points detected from the eyeball area of the first face image of the user, and to determine a position of a second center point of the cornea corresponding to the second face image by applying the at least two second image feature points to a first vector connecting the at least two first image feature points to the position of the first center point of the cornea. A vector calculator may be configured to determine a second vector connecting the second center point of the cornea to the second center point of the pupil. A gaze tracker may be configured to track the gaze of the user by using the second vector.

In certain embodiments, at least one of the at least two second image feature points may be substantially identical to at least one of the at least two feature points.

In certain embodiments, the position determiner may be configured to determine the position of the first center point of the cornea as a crossing point of at least two extension lines, where each of the extension lines connects one of at least two lightings to one of the at least two lighting reflection points.

In certain embodiments, the at least two first image feature points may include a left end point and a right end point of an eye of the user. In certain embodiments, the vector calculator may be configured to determine a left vector from the left end point of the eye of the user to the first center point of the cornea and to determine a right vector from the right end point of the eye of the user to the first center point of the cornea.

In certain embodiments, at lest one of the at least two first image feature points may include at least one of a facial feature point of the user and a feature point of an accessory worn by the user.

In certain embodiments, at least one of the at least two second image feature points comprises at least one of a facial feature point of the user and an accessory feature point of an accessory worn by the user.

In certain embodiments, the at least two second image feature points comprise a left end point and a right end point of an eye of the user.

In certain embodiments, the vector calculator may be further configured to determine the first vector.

BRIEF DESCRIPTION OF THE DRAWINGS

The objects, features and advantages of the present inventive concept will be more apparent from the following detailed description in conjunction with the accompanying drawings, in which.

DETAILED DESCRIPTION

Exemplary embodiments of the present inventive concept are described with reference to the accompanying drawings in detail. The same reference numbers are used throughout the drawings to refer to the same or like parts. Detailed descriptions of well-known functions and structures incorporated herein may be omitted to avoid obscuring the subject matter of the present inventive concept.

Figure 1:
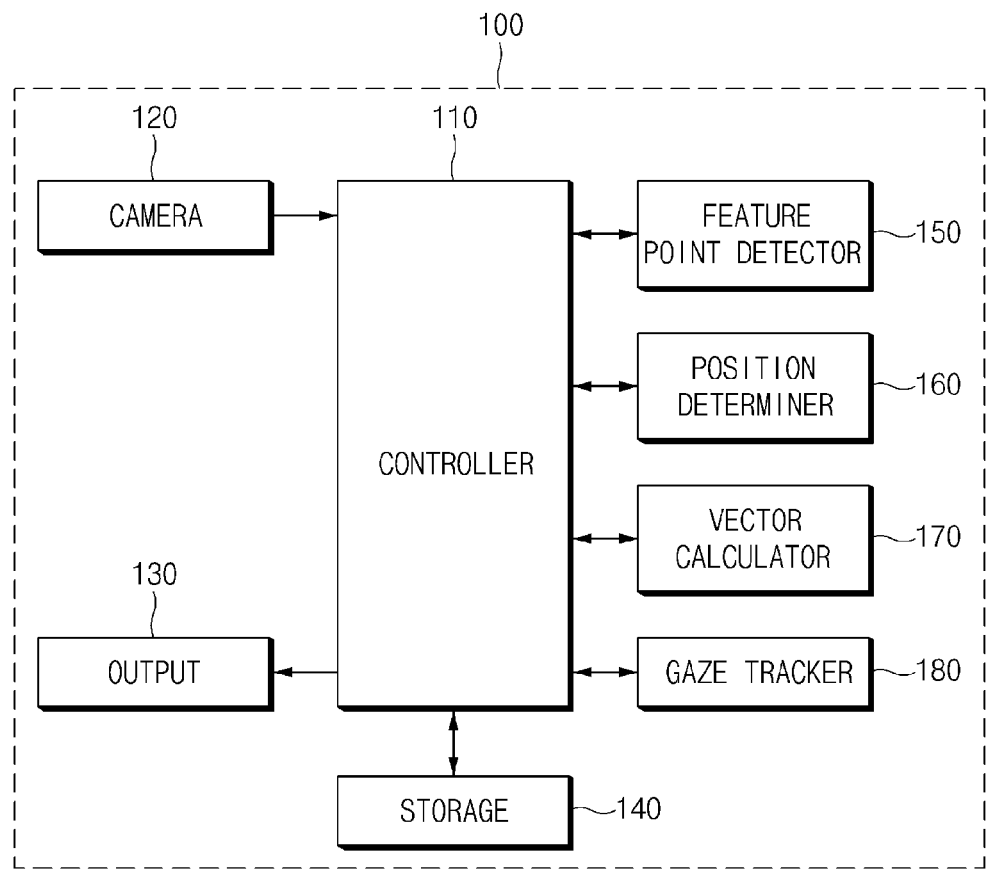
FIG. 1 is a block diagram illustrating a configuration of an apparatus for tracking a gaze according to an embodiment of the present inventive concept.

FIG. 1 is a block diagram illustrating a configuration of an apparatus for tracking a gaze according to an embodiment of the present inventive concept.

Referring to FIG. 1, the apparatus 100 for tracking a gaze according to an embodiment of the present inventive concept may include a controller 110, a camera 120, an output 130, a storage 140, a feature point detector 150, a position determiner 160, a vector calculator 170, and a gaze tracker 180. In this case, the controller 110 may control operations of each unit of the apparatus 100 for tracking the gaze.

The camera 120 is a device for photographing an image of a user, particularly a face image. For example, the camera 120 may photograph a face image of a driver boarding on a vehicle. In this case, at least two cameras 120 may be provided. Meanwhile, the camera 120 may be a stereo camera equipped with at least two imaging lenses. In this case, the camera 120 may include a charge coupled device (CCD) camera, a complementary metal oxide semiconductor (CMOS) camera, and the like, but the embodiment of the present inventive concept is not limited thereto.

The output 130 may output a gaze tracking result derived by the apparatus for tracking a gaze. In this case, the output 130 may provide the gaze tracking result to an external device connected in wireless communication or an external device connected in a wired scheme through a cable. For example, the output 130 may provide the gaze tracking result from the apparatus 100 for tracking a gaze to a monitor inside of a vehicle. Further, the output 130 may provide the gaze tracking result to a vehicle control system for controlling drive of the vehicle according to a state of a driver.

The storage 140 may store a setting value to operate the apparatus 100 for tracking a gaze and result values from respective units of the apparatus 100 for tracking a gaze. Further, the storage 140 may store a program, control logic, or an algorithm to implement the operations of the respective units of the apparatus 100 for tracking a gaze. For example, the storage 140 may store feature point detecting control logic, position estimation control logic, vector calculation control logic, and gaze tracking control logic.

The feature point detector 150 may detect feature points from a face image of the user. The feature point detector 150 may detect a lighting reflection point generated due to lighting of the camera 120 from an eyeball area of the face image of the user. Accordingly, in the present inventive concept, it is assumed that at least two lightings are provided. Accordingly, the feature point detector 150 may detect at least two lighting reflection points generated due to at least two lightings from the face image of the user. Further, the feature point detector 150 may detect a center point of a pupil from the eyeball area of the face image of the user.

In addition, the feature point detector 150 may detect at least two feature points having a fixed position in the face image of the user. For example, the feature point detector 150 may detect a left end point and a right end point of an eye of the user from the eyeball area of the face image of the user. Alternatively, the feature point detector 150 may detect a face feature point, e.g., a point, a scar, and a specific position of an eyebrow, of the user in the face image of the user, and a specific position of an accessory, e.g., spectacles, worn by the user.

In this case, when detecting a feature point applied for the tracking of the gaze from the face image of the user, the feature point detector 150 may detect the same feature point from another face image of the user based on the detected feature point. When the same feature point is not detected from the face image of the user, the feature point detector 150 may detect again a new feature point.

The position determiner 160 may determine a position of the center point of cornea by using at least two lighting reflection points detected from the feature point detector 150 with respect to the eyeball area of the face image of the user. Hereinafter, a face image having at least two lighting reflection points detected by the feature point detector 150 is referred to as a first face image.

For example, the position determiner 160 may determine a crossing point of an extension line connecting at least two lightings to emit light in different directions based on a position of the cornea of the user to at least two lighting reflection points generated at the eyeball area of a first face image by the at least two lightings as a center point of cornea.

Meanwhile, if at least two lighting reflection points are not detected from the feature point detector 150 with respect to the eyeball area of the face image of the user, the position determiner 160 may request a position of feature point in a corresponding face image through the feature point detector 150. Hereinafter, a face image not having at least two lighting reflection points detected by the feature point detector 150 is referred to as a second face image. In this case, the position determiner 160 may determine a position of a center of pupil for the second face image by using a first vector calculated based on a feature point detected in the second face image from the feature point detector 150, and a position of a center of pupil previously detected from the first face image.

The vector calculator 170 may calculate a vector to a center point of cornea determined by the position determiner 160 with respect to a first image from at least two feature points detected from the first face image. For example, the vector calculator 170 may calculate a vector from a left end point of an eye of the user detected from the first face image to a center point of cornea, and may calculate a vector from a right end point of an eye of the user to the center point of cornea. In this case, the calculated vector is referred to as a first vector. The first vector may be used to determine a position of the center point of cornea from the second face image by the position determiner 160.

Meanwhile, the vector calculator 170 may calculate a vector connecting the center point of cornea determined by the position determiner 160 with respect to the second face image to a center of pupil detected from an eyeball area of the second face image. In this case, the calculated vector is referred to as a second vector. The second vector is transferred to the gaze tracker 180 so that the second vector may be used to track a gaze of the user with respect to the second face image.

The gaze tracker 180 may track a gaze direction of the user with respect to the second face image by using the second vector calculated by the vector calculator 170. In this case, the gaze tracker 180 may track the gaze of the user based on a position that an extension line extending the second vector reached. Gaze information of the user tracked by the gaze tracker 180 may be stored in the storage 140, and may be provided to an external device through the output 130.

Operations of respective units of an apparatus for tracking a gaze according to the present inventive concept having above mentioned configuration is described in detail.

Figure 2:
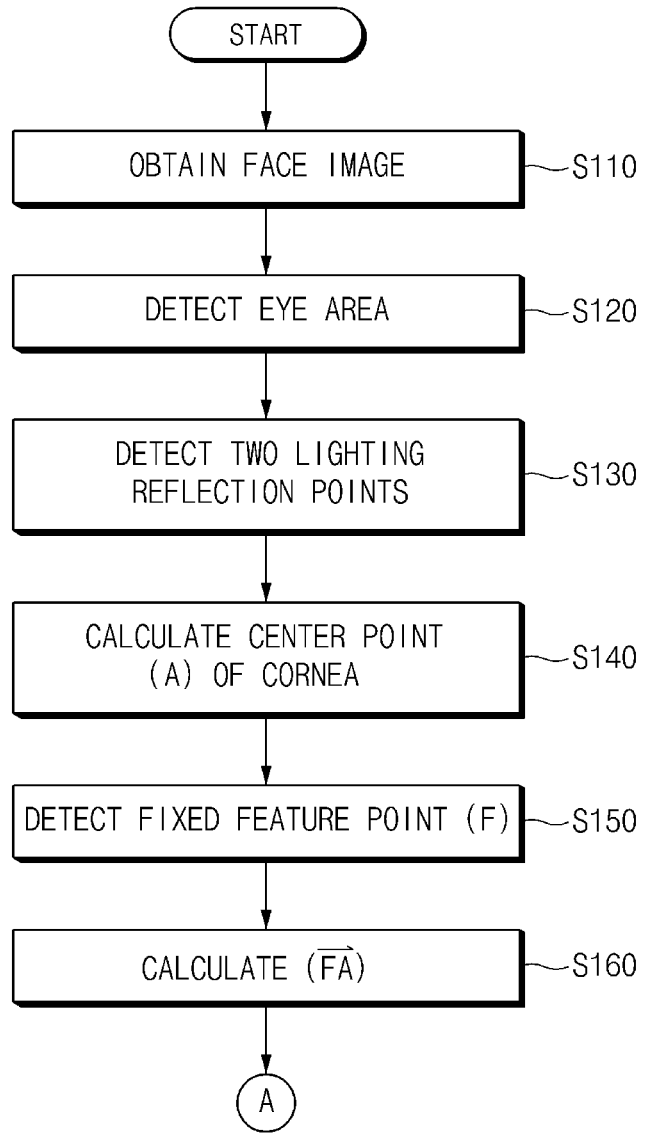
FIGS. 2 and 3 are flow charts illustrating an operation sequence of a method for tracking a gaze according to an embodiment of the present inventive concept.
Figure 3:
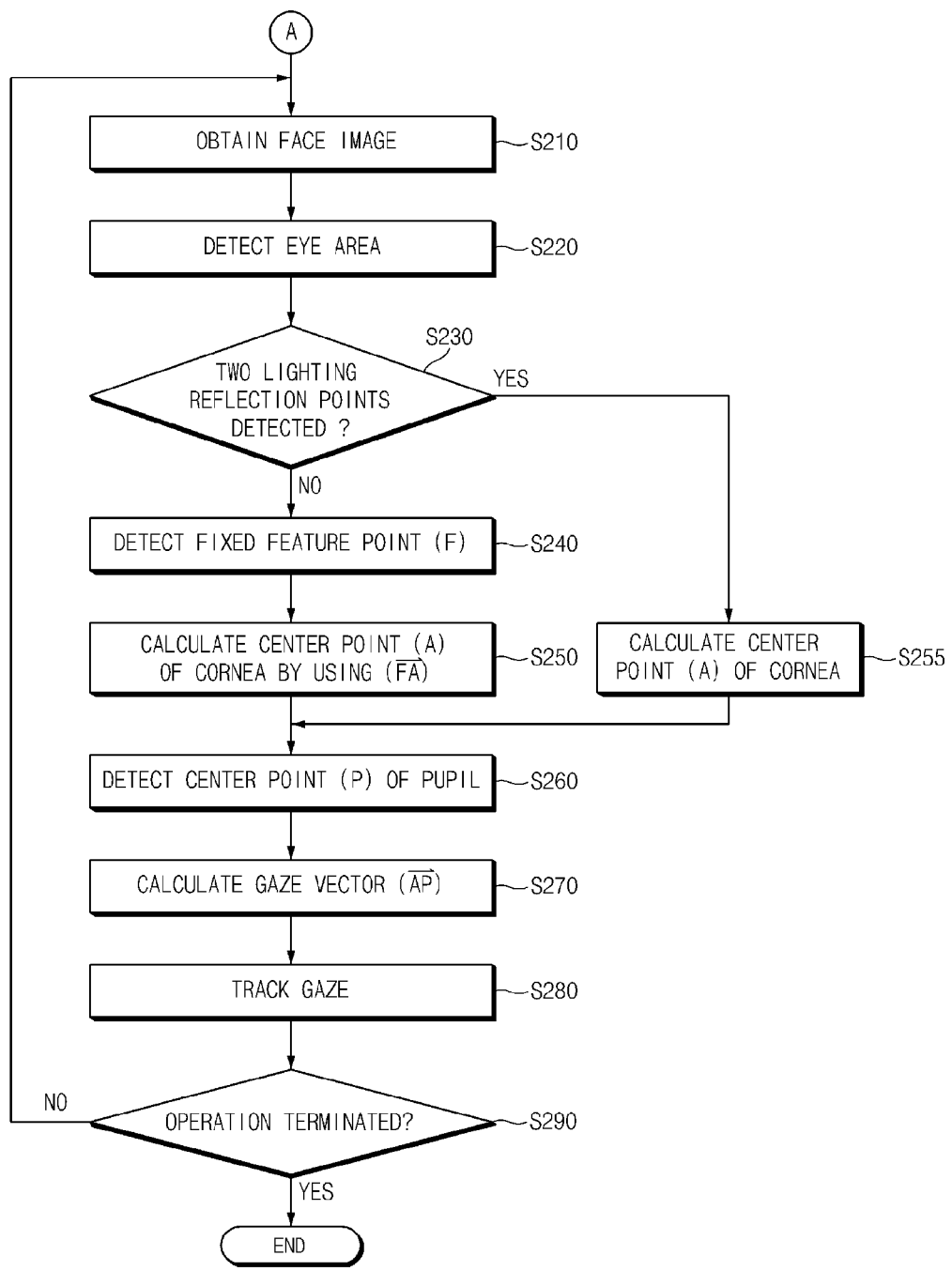

FIGS. 2 and 3 are flow charts illustrating an operation flow of a method for tracking a gaze according to an embodiment of the present inventive concept.

First, FIG. 2 illustrates an operation of determining a first vector by using a first face image of a user.

As shown in FIG. 2, when an apparatus for tracking a gaze obtains a face image of a user, i.e., a first face image through a camera (S110), a feature point detector 150 may detect an eyeball area of the first face image obtained at step S110 (S120). The camera may be a stereo camera having two lenses, or two cameras may be provided.

Next, the feature point detector 150 of the apparatus for tracking a gaze may detect two lighting reflection points due to lighting of the camera in the eyeball area detected at step S120 (S130). In this case, the position determiner 160 may calculate a center point A of cornea with respect to the first face image by using the two lighting reflection points detected at step S120 (S140). In this case, the position determiner 160 may determine a crossing point of an extension lines connecting two lightings to emit light in different directions based on a position of the cornea of the user to the lighting reflection points generated corresponding to the respective lightings as a center point A of cornea.

After that, the feature point detector may detect two feature points F having a fixed position from the first face image (S150). In this case, the vector calculator may calculate a first vector $\overrightarrow{FA}$ connecting the center point A of cornea calculated at step S140 from the two feature points F detected at step S150 (S160).

The apparatus for tracking a gaze may store the first vector calculated at step S160 and use the first vector in a following steps, i.e., after ⓐ. In other words, the apparatus for tracking a gaze may store the first vector calculated at step 'S160' in a storage, and calculates the position of a center point of cornea by using the first vector when two lighting reflection points are not detected from the face image of the user so that it is difficult to calculate a center point of cornea. It is obvious that the apparatus for tracking a gaze is able to track the gaze of the user with respect to the first face image by using the center point A of cornea calculated at step S140.

FIG. 3 illustrates a procedure after ⓐ, i.e., after the step S160, and illustrates an operation of tracking a gaze of the user by using the first vector by the apparatus for tracking a gaze.

As shown in FIG. 3, the apparatus for tracking a gaze obtains a face image, i.e., a second face image through the camera (S210). In this case, the feature point detector may detect an eyeball area of the second face image obtained at step S210 (S220). In addition, the feature point detector of the apparatus for tracking a gaze may detect two lighting reflection points generated by the lighting of the camera in the eyeball area detected at step S220 (S230).

If two lighting reflection points are detected in the eyeball area of the second face image, the position determiner 160 may calculate a center point A of cornea for the second face image by using the detected two lighting reflection points in the same manner as in step S140 (S255).

On the other hand, if the two lighting reflection points are not detected at step S230, the feature point detector detects the second face image having the same feature point as the detected feature point A at step S150 (S240). Next, the position determiner 160 may calculate a center point A of cornea for the second face image by applying the feature point F detected at step S240 to the first vector calculated by using the feature point F at step S160 (S250).

When the calculation of the center point A of the cornea is terminated at step S250' or 'S255, the feature point detector 150 may detect a center point P of the pupil from the eyeball area of the second face image (S260). The vector calculator 170 may calculate a second vector $\overrightarrow{AP}$ connecting a center point A of the cornea calculated at step S250 or S255 to the center point P of the pupil detected at step S260 as a gaze vector (S270).

The gaze tracker 180 of the apparatus for tracking a gaze may track the gaze of the user by using the gaze vector calculated at step S270 (S280). In this case, the gaze tracker 180 may track the gaze of the user based on a position that an extension line extending the second vector reaches.

The apparatus for tracking a gaze may repeatedly perform steps S210 to S280 until a separate operation termination command is generated. If an operation termination command for the gaze tracking is generated (S290), a corresponding operation is terminated.

Figure 4:
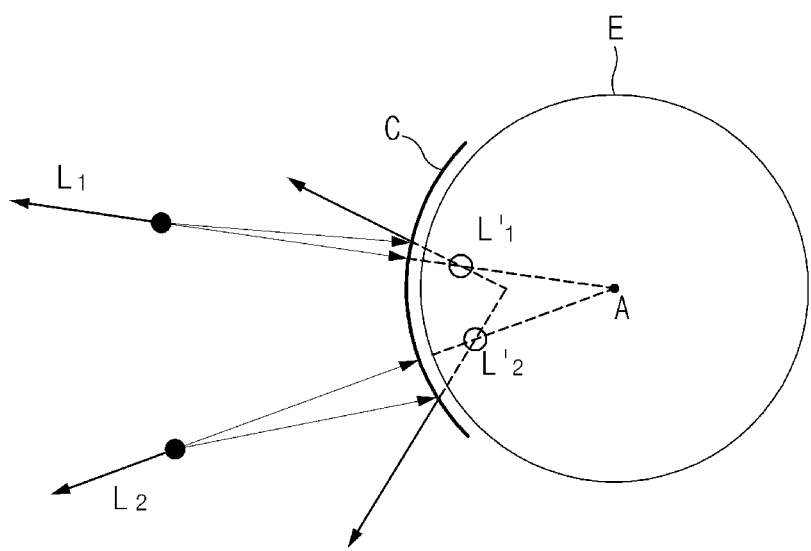
FIGS. 4 and 5 are exemplary diagrams illustrating a first vector calculation operation according to an embodiment of the present inventive concept.
Figure 5:
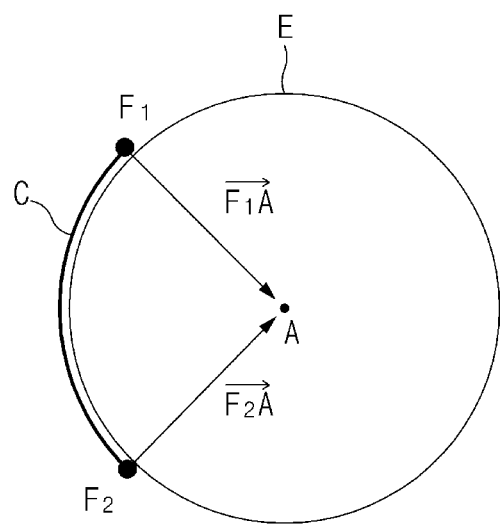

FIGS. 4 and 5 are exemplary diagrams illustrating a first vector calculation operation according to an embodiment of the present inventive concept. In this case, FIGS. 4 and 5 illustrate an eyeball shape vertically viewed from the top.

Referring to FIG. 4, an E represents an eyeball, a C represents a cornea, and L1 and L2 represent lighting of the camera. L1' and L2' represent a lighting reflective virtual image point formed in the cornea by the lightings L1 and L2 of the camera, and A represents a center point of cornea.

First, the apparatus for tracking a gaze may determine the positions of the lightings L1 and L2 based on the cornea, and determine the positions of L1' and L2' formed at the eyeball area from the face image of the user photographed by using the lightings L1 and L2. In this case, the apparatus for tracking a gaze may calculate a crossing point A between an extension line connecting the L1 to the L1' and an extension line connecting the L2 to the L2', and may determined the calculated point A as a center point of cornea.

In the meantime, as shown in FIG. 5, the apparatus for tracking a gaze may detect a feature point having a fixed position, specifically, at least two feature points from the face image of the user photographed by using the lightings L1 and L2. An operation of detecting the fixed feature point from the face image of the user is described in detail with reference to an embodiment of FIG. 6. In the embodiment of FIG. 5, it is illustrated that a right end point F1 and a left end point F2 of an eye of the user are detected as feature points.

Next, the apparatus for tracking a gaze may calculate a vector $\overrightarrow{F_1A}$ connecting the center point A of cornea from the feature point F1, and calculates a vector $\overrightarrow{F_2A}$. connecting the center point A of cornea from the second feature point F2. In this case, the calculated vectors $\overrightarrow{F_1A}$ and $\overrightarrow{F_2A}$ may be used, when the lighting reflection point is not detected from the face image of the user such that the position of the center point of cornea cannot be specified.

Figure 6:
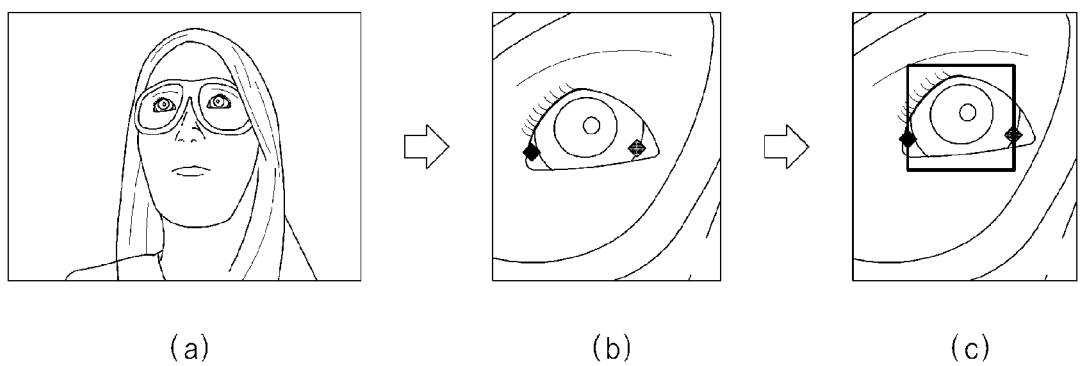
FIG. 6 is an exemplary diagram illustrating an operation of detecting a feature point according to an embodiment of the present inventive concept.

FIG. 6 is an exemplary diagram illustrating an operation of detecting a feature point according to an embodiment of the present inventive concept.

Referring to FIG. 6, the apparatus for tracking a gaze may photograph a face image of the user by using a camera. (a) of FIG. 6 illustrates the face image of a user. In this case, the apparatus for tracking a gaze may detect a feature point with a fixed position from the face image of the user shown in (a). In this case, the apparatus for tracking a gaze may detect the feature point having a fixed position by analyzing a continuous frame of an image. For example, as shown in (b) of FIG. 6, the apparatus for tracking a gaze may detect both ends of the eye of the user as the feature point.

In this case, as shown in (c) of FIG. 6, the apparatus for tracking a gaze may specify the eyeball area based on the feature point detected in (b) of FIG. 6.

Figure 7:
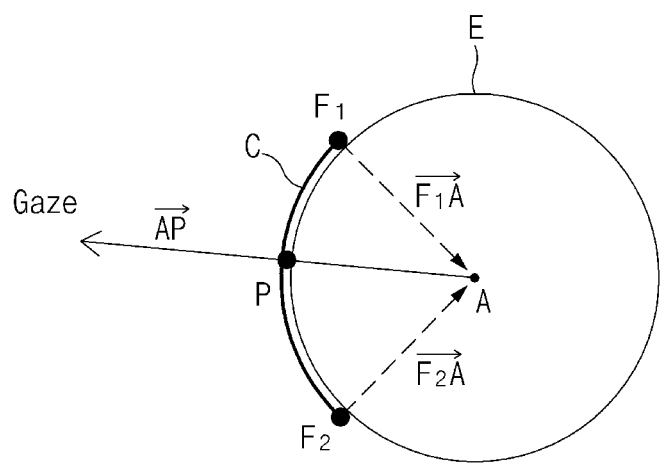
FIG. 7 is an exemplary diagram illustrating an operation of determining a gaze vector according to an embodiment of the present inventive concept.

FIG. 7 is an exemplary diagram illustrating an operation of determining a gaze vector according to an embodiment of the present inventive concept. In the embodiment of FIG. 7, it is assumed that the lighting reflection point is not detected in an eyeball area from the face image of the user photographed by the camera.

Referring to FIG. 7, since the apparatus for tracking a gaze cannot calculate a center point of cornea by using the lighting reflection point, the center point of cornea may be calculated by using vectors $\overrightarrow{F_1A}$ and $\overrightarrow{F_2A}$ calculated in FIG. 5 and the feature points F1 and F2.

In other words, when the lighting reflection point is not detected from the face image of user, the apparatus for tracking a gaze may detect the feature points F1 and F2 used to calculate the vectors $\overrightarrow{F_1A}$ and $\overrightarrow{F_2A}$ from the face image not having a detected lighting reflection point. In this case, if the feature points F1 and F2 are detected from the face image, the apparatus for tracking a gaze may calculate a position of the center point of cornea by applying the feature points F1 and F2 detected from the face image to the vectors $\overrightarrow{F_1A}$ and $\overrightarrow{F_2A}$.

In this case, the apparatus for tracking a gaze may detect a center point of pupil from the face image of the user, calculate a vector $\overrightarrow{AP}$ connecting the previously calculated center point of cornea to the center point of pupil, and track the gaze of the user by using the calculated vector $\overrightarrow{AP}$.

The above procedures may be directly implemented by a hardware, a software module, or a combination thereof executed by a processor. The software module may reside in a storage medium such as an RAM, a flash memory, an ROM, an EPROM, an EEPROM, a register, a hard disc, a removable disc, and a CD-ROM, that is, in a memory and/or storage. An exemplary storage medium is coupled with the processor. The processor may read information from the storage medium and may write information in the storage medium. Alternatively, the storage medium may be integrated with the processor. The processor and the storage medium may reside in an application specific integrated circuit (ASIC). The ASIC may reside in a user terminal. Alternatively, the processor and the storage medium may reside in the user terminal as a separate component.

According to a method and an apparatus for exactly tracking a gaze of the present inventive concept, the gaze may be exactly tracked regardless of a surrounding environment by using a vector calculated based on a position of a center point of cornea determined from an image having the detected lighting reflection point to determine a position of a center point in a cornea of an image not having a detected lighting reflection point.

Further, the present inventive concept may enhance an accuracy of gaze tracking by determining the position of a center point in a cornea by using a feature point having a fixed position in a face image, and tracking the gaze based on the determined position of a center point in the cornea.

Although exemplary embodiments of the present inventive concept have been described in detail hereinabove, it should be clearly understood that many variations and modifications of the basic inventive concepts herein taught which may appear to those skilled in the present art will still fall within the spirit and scope of the present inventive concept, as defined in the appended claims.

What is claimed is:

1. A method for tracking a gaze, the method comprising:
   determining a position of a first center point of a cornea by using at least two first lighting reflection points detected from an eyeball area of a first face image of a user;
   determining a first vector connecting at least two first image feature points detected from the first face image to the position of the first center point of the cornea, wherein the at least two first image feature points have a fixed position in the face image of user;
   determining a position of a second center point of the cornea corresponding to a second face image using the first vector and a position of at least two second image feature points detected from the second face image, when at least two second lighting reflection points are not detected from an eyeball area of the second face image of the user;
   determining a second vector using the position of the second center point of the cornea and a position of a center point of a pupil detected from the eyeball area of the second face image; and tracking the gaze of the user by using the second vector.

2. The method of claim 1, wherein at least one of the at least two second image feature points is identical to at least one of the at least two first image feature points.

3. The method of claim 1, wherein the second vector is a vector of a direction towards the center point of the pupil from the second center point of the cornea.

4. The method of claim 1, wherein the step of determining the position of the first center point of the cornea comprises:

detecting the at least two first lighting reflection points, the at least two first lighting reflection points being generated due to at least two lightings; and determining the first center point of the cornea as a crossing point of at least two extension lines, where each of the at least two extension lines connects one of the at least two lightings to one of the at least two first lighting reflection points.

5. The method of claim 1, wherein the at least two first image feature points comprise a left end point and a right end point of an eye of the user.

6. The method of claim 5, wherein the step of determining the first vector comprises:

determining a left vector from the left end point of the eye of the user to the first center point of the cornea; and determining a right vector from the right end point of the eye of the user to the first center point of the cornea.

7. The method of claim 1, wherein at least one of the at least two first image feature points comprises at least one of a facial feature point of the user and a feature point of an accessory worn by the user.

8. The method of claim 1, wherein the at least two second image feature points comprise a left end point and a right end point of an eye of the user.

9. The method of claim 1, wherein at least one of the at least two second image feature points comprises at least one of a facial feature point of the user and an accessory feature point of an accessory worn by the user.

10. An apparatus for tracking a gaze, the apparatus comprising:

a controller configured to detect at least two lighting reflection points and a first center point of a pupil from an eyeball area of a first face image of a user, at least two first image feature points from the first face image, and a second center point of the pupil and at least two second image feature points from a second face image of the user, wherein the first image feature points and the second image feature points have a fixed position in the face image of user, wherein the controller is further configured to:

determine a position of a first center point of a cornea by using the at least two lighting reflection points detected from the eyeball area of the first face image of the user, and to determine a position of a second center point of the cornea corresponding to the second face image by applying the at least two second image feature points to a first vector connecting the at least two first image feature points to the position of the first center point of the cornea;

determine a second vector connecting the second center point of the cornea to the second center point of the pupil; and track the gaze of the user by using the second vector.

11. The apparatus of claim 10, wherein the at least one of the at least two second image feature points is identical to at least one of the at least two first image feature points.

12. The apparatus of claim 10, wherein the controller is configured to determine the position of the first center point of the cornea as a crossing point of at least two extension lines, where each of the at least two extension lines connects one of at least two lightings to one of the at least two lighting reflection points.

13. The apparatus of claim 10, wherein the at least two first image feature points comprise a left end point and a right end point of an eye of the user.

14. The apparatus of claim 13, wherein the controller is configured to determine a left vector from the left end point of the eye of the user to the first center point of the cornea and to determine a right vector from the right end point of the eye of the user to the first center point of the cornea.

15. The apparatus of claim 10, wherein at least one of the at least two first image feature points comprises at least one of a facial feature point of the user and a feature point of an accessory worn by the user.

16. The apparatus of claim 10, wherein at least one of the at least two second image feature points comprises at least one of a facial feature point of the user and an accessory feature point of an accessory worn by the user.

17. The apparatus of claim 10, where the controller is further configured to determine the first vector.

18. The apparatus of claim 10, wherein the at least two second image feature points comprise a left end point and a right end point of an eye of the user.

* * * * *